United States Patent
Feng et al.

(10) Patent No.: US 7,336,600 B2
(45) Date of Patent: Feb. 26, 2008

(54) CELL SEARCH METHOD FOR ORTHOGONAL FREQUENCY DIVISION MULTIPLEXING BASED CELLULAR COMMUNICATION SYSTEM

(75) Inventors: Chih-Chun Feng, Yun-Lin (TW); Yung-Hua Hung, Hsinchu (TW); Chun-Hung Liu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 799 days.

(21) Appl. No.: 10/748,550

(22) Filed: Dec. 29, 2003

(65) Prior Publication Data

US 2005/0157637 A1    Jul. 21, 2005

(51) Int. Cl.
*H04J 11/00* (2006.01)
(52) U.S. Cl. ........................ 370/208; 370/320
(58) Field of Classification Search ............... 370/389, 370/203, 208, 349, 392, 470, 471, 474, 320, 370/335, 342, 210, 441, 148, 260, 144
See application file for complete search history.

(56) References Cited

U.S. PATENT DOCUMENTS

| | | | |
|---|---|---|---|
| 5,914,931 A * | 6/1999 | Kang et al. | 370/203 |
| 6,515,960 B1 * | 2/2003 | Usui et al. | 370/203 |
| 6,567,383 B1 * | 5/2003 | Bohnke | 370/280 |
| 7,161,895 B1 * | 1/2007 | Sudo | 370/204 |
| 7,161,927 B2 * | 1/2007 | Wu et al. | 370/342 |
| 2002/0054585 A1 | 5/2002 | Hanada et al. | 370/342 |
| 2002/0181421 A1 | 12/2002 | Sano et al. | 370/335 |
| 2003/0193970 A1 * | 10/2003 | Kim et al. | 370/509 |

FOREIGN PATENT DOCUMENTS

| | | |
|---|---|---|
| EP | 0 940 942 A2 | 9/1999 |
| JP | 2002-118496 | 4/2002 |
| JP | 2003-179522 | 6/2003 |
| JP | 2003-244763 | 8/2003 |
| JP | 2006-507753 | 3/2006 |

OTHER PUBLICATIONS

Three-Step Fast Cell Search Algorithm Utilizing Common Pilot Channel for OFCDM Broadband Packet Wireless Access/Motohiro Tanno, Hiroyuki Atarashi, Kenichi Higuchi, and Mamoru Sawahashi, IEEE, pp. 1575-1579, 2002.
Three-Step Search Algorithm for Broadband Multi-carrier CDMA Packet Wireless Access/Yukiko Hanada, Kenichi Higuchi, and mamoru Sawahashi, IEEE, pp. G32-G37, 2001.

* cited by examiner

*Primary Examiner*—Brenda Pham

(57) ABSTRACT

A method for synchronizing and identifying the cell code (scrambling code) of a cell in an orthogonal frequency division multiplexing (OFDM) based cellular communication system is provided. In this method, desired cell is found by utilizing a frame structure of OFDM symbols and through a corresponding cell search procedure, where the frame structure has periodic signal pattern and contains the information about the cell code of the desired cell in common pilot channel (CPICH) signal. And, the cell search method utilizes the periodic property of the frame structure to detect frame timing, and the correlation property of CPICH signal to identify the cell code. The cell search method of the present invention offers the advantages of good link quality, fast acquisition, and low power consumption.

12 Claims, 18 Drawing Sheets

CELL SEARCH METHOD FOR ORTHOGONAL FREQUENCY DIVISION MULTIPLEXING BASED CELLULAR COMMUNICATION SYSTEM

FIELD OF THE INVENTION

The present invention generally relates to orthogonal frequency division multiplexing (OFDM) based technology such as orthogonal frequency division multiple access (OFDMA) technology and combination of OFDM and code division multiple access (CDMA) technologies, known as OFDM-CDMA technology, and more particularly to a cell search method for OFDM based cellular communication systems.

BACKGROUND OF THE INVENTION

In an OFDM based cellular communication system, a mobile station (MS) may receive downlink-transmitted signals from different cells and may need to differentiate these signals by using different cell codes. For example, in an OFDM-CDMA cellular system, the downlink-transmitted signals from different cells are differentiated by using scrambling codes (cell codes), thereby allowing for reuse of frequency and spreading codes in contiguous cells. As such, an MS terminal, when switched on, needs to search for a cell (i.e., synchronizing to the associated downlink scrambling code) before any communication. This procedure is known as initial cell search. On the other hand, during active or idle modes of an MS terminal, searching for a cell is also needed for identifying handoff candidates. This procedure is known as target cell search. The performance of cell search method directly impacts the perceived switch-on delay, link quality and power consumption of an MS. Therefore, cell search is important for the design of OFDM based cellular communication systems.

For brevity, cell search methods here are described in terms of only multi-carrier CDMA (MC-CDMA) system, one type of OFDM-CDMA systems, although they may also be applied to other OFDM based systems. Conventional cell search methods for MC-CDMA cellular systems include two types of methods, synchronization channel (SCH)-based method and common pilot channel (CPICH)-based method, in which cell search procedure is highly dependent on the frame structure of downlink-transmitted signal.

Consider that there are J downlink scrambling codes, denoted by $C^{(i)}[k]$, $k=0\sim K-1$, $i=1\sim J$, allowing for unique cell identification in every cluster of J cells where K is the length of the scrambling codes. Assume that cell j with the scrambling code $C^{(j)}[k]$ is the desired cell to be searched for. Typically, the J cells are further divided into several groups to reduce the number of scrambling codes to be searched for, where each group is represented by a group code.

FIG. 1 shows the frame structure of the SCH-based cell search method. Each frame consists of M OFDM symbols. Each OFDM symbol consists of not only $N_{FFT}$-sample useful data but also $N_{GI}$-sample cyclic prefix (CP), namely, guard interval (GI), for avoiding intersymbol interference (ISI) as well as inter-carrier interference (ICI). Accordingly, the length of an OFDM symbol is $N_{OFDM}=N_{FFT}+N_{GI}$. The downlink-transmitted signal in FIG. 1 includes three types of signals, CPICH signal, SCH signal, and traffic channel (TCH) signal. CPICH signal contains the information about the scrambling code, while SCH signal about the group code and frame timing. TCH signal is used for transmitting TCH data. In the transmitter of the base station (BS) in cell j, the data of TCHs and CPICH are spread in frequency domain by different spreading codes, and then added and scrambled by the scrambling code $C^{(j)}[k]$. The scrambled signal is further combined with SCH signal, modulated via an $N_{FFT}$-point inverse discrete Fourier transform (IDFT) (or, more efficiently, inverse fast Fourier transform (IFFT)), and inserted with GI to generate the downlink-transmitted signal. The number of sub-carriers is exactly identical to the length of the scrambling code (K), and the IFFT size $N_{FFT} \geq K$.

In the receiver of an MS, the received signal is processed by the cell search procedure shown in FIG. 2. The procedure involves three steps: (S1) symbol synchronization to detect OFDM symbol timing (OFDM symbol boundary), (S2) frame synchronization and group identification to detect flame timing (flame boundary) and the group code, and (S3) scrambling-code identification to detect the scrambling code $C^{(j)}[k]$. In step S1, the symbol timing is detected by using the correlation property of CP. In step S2, after removing GI from the received signal and performing $N_{FFT}$-point discrete Fourier transform (DFT) (or, more efficiently, fast Fourier transform (FFT)), the frame timing and group code are simultaneously detected by using SCH signal in frequency domain. In step S3, the scrambling code $C^{(j)}[k]$ is identified from the detected group by using CPICH signal, and verification is conducted to avoid false detection, thereby minimizing unnecessary MS activities.

Because SCH signal is not orthogonal to TCH signal and CPICH signal, cell detection performance of the SCH-based method is degraded due to the interference from TCH signal and CPICH signal, and data detection performance is also degraded due to the interference from SCH signal. For this reason, the CPICH-based method (to be described next) does not include SCH signal into the frame structure, and thus performs much better than the SCH-based method.

FIG. 3 shows the frame structure of the CPICH-based cell search method. Each frame consists of M OFDM symbols. Each OFDM symbol of length $N_{OFDM}$ samples consists of $N_{FFT}$-sample useful data and $N_{GI}$-sample CP (GI). The first and last OFDM symbols, indicated by CPICH1 and CPICH2, respectively, correspond to CPICH signal, while the remaining (M−2) OFDM symbols are used for transmitting TCH data, where $R_{CPICH}$ is the power ratio of CPICH signal to the signal of one TCH. CPICH signal contains the information about the scrambling code, group code and frame timing. Because CPICH signal and TCH signal are allocated in different OFDM symbols (i.e., different time slots), no interference between them is incurred. Similar to the SCH-based method, the receiver of an MS for the CPICH-based method also uses the three-step cell search procedure shown in FIG. 2. The only difference is that in step S2, the frame timing and group code are simultaneously detected by using CPICH signal, instead of SCH signal, in frequency domain.

Recall that step S1 for both the SCH-based and CPICH-based methods is performed in time domain, while steps S2 and S3 in frequency domain using $N_{FFT}$-point DFT (or FFT). In step S2, a lot of candidates for detecting the frame boundary need to be tested in frequency domain to find an optimum one. This implies that step S2 requires a lot of DFT (or FFT) operations for frame synchronization. Accordingly, the conventional cell search methods require high computation complexity. Furthermore, cell detection performance of the CPICH-based method is sensitive to channel effects because of a restrictive assumption for channel response in step S3. When this assumption is not satisfied that is the typical case in practical application, it may lead to false detection.

In the European patent application EP0940942, a synchronization preamble and synchronization protocol for an MC-CDMA mobile communication system is disclosed. The communication method enables remote stations to synchronize in time and frequency to their serving base station. It enables a base station and its remote stations in a cell to synchronize in a noisy environment where signal is interfered by other base stations and remote stations in other cells. One major drawback of the communication method is the cell detection performance also sensitive to channel effects.

SUMMARY OF THE INVENTION

The present invention has been made to overcome the above-mentioned shortcomings of conventional cell search methods for OFDM based cellular communication systems. An object of the present invention is to provide a low-complexity and robust cell search method, whereby a new frame structure is introduced. For low-complexity cell search, the frame structure is designed to exhibit periodic signal pattern and meanwhile contains the information about the cell code of desired cell in CPICH signal. Furthermore, the cell search method utilizes the periodic property to detect frame timing, and the correlation property of CPICH signal to identify the cell code.

According to the preferred embodiments of the invention, the cell search method taking advantage of the property of periodic signal pattern requires only one or two DFT (or FFT) operations of small size, and is quite robust against channel effects. Simulation results demonstrate that the cell search method of the present invention outperforms the conventional CPICH-based method for both initial and target cell search. Better cell detection performance implies fewer iterations in cell search procedure for finding a cell-code candidate with high-confidence score, and accordingly less average acquisition time as well as lower power consumption. As a consequence, the cell search method of the present invention provides the advantages of better link quality, faster acquisition, and lower power consumption.

The foregoing and other objects, features, aspects and advantages of the present invention will become better understood from a careful reading of the detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein:

FIG. 8b shows another view of the frame structure in FIG. 8a;

FIG. 9a shows the detailed structure of CPICH1 in FIG. 8a;

FIG. 9b shows the detailed structure of CPICH2 in FIG. 8a;

FIG. 12b shows the detailed structure of CPICH in FIG. 12a;

DETAILED DESCRIPTION OF THE PREFERRED EMBODIMENTS

In an OFDM based cellular system, suppose that there are J cells in a cluster and cell j is the desired cell to be searched for. The J cells are differentiated by using J different cell codes, denoted by $C^{(i)}[k]$, $k=0 \sim L_C-1$, $i=1 \sim J$, where $L_C$ is the length of the cell codes. The length $L_C$ is chosen such that unique cell identification in every cluster of J cells can be achieved, and it is not necessary to be identical to the number of sub-carriers (K). To reduce the complexity of cell identification, every cell code can be further represented by two or more sequences. Without loss of generality, let a cell code be represented by two sequences $P^{(i)}[k]$, $k=0 \sim L_P-1$, $i \in \{1, 2, \ldots, P-1\}$, and $Q^{(l)}[k]$, $k=0 \sim L_Q-1$, $l \in \{1, 2, \ldots, Q-1\}$, where $L_P$ and $L_Q$ are the length of $P^{(i)}[k]$ and $Q^{(l)}[k]$, respectively, and $P \cdot Q \geq J$. Furthermore, let the cell code $C^{(j)}[k]$ associated with cell j be represented by the two sequences $P^{(p)}[k]$ and $Q^{(q)}[k]$. Then, identification of the cell code $C^{(j)}[k]$ is turned into the problem of identifying both the sequences $P^{(p)}[k]$ and $Q^{(q)}[k]$.

Figure 1:
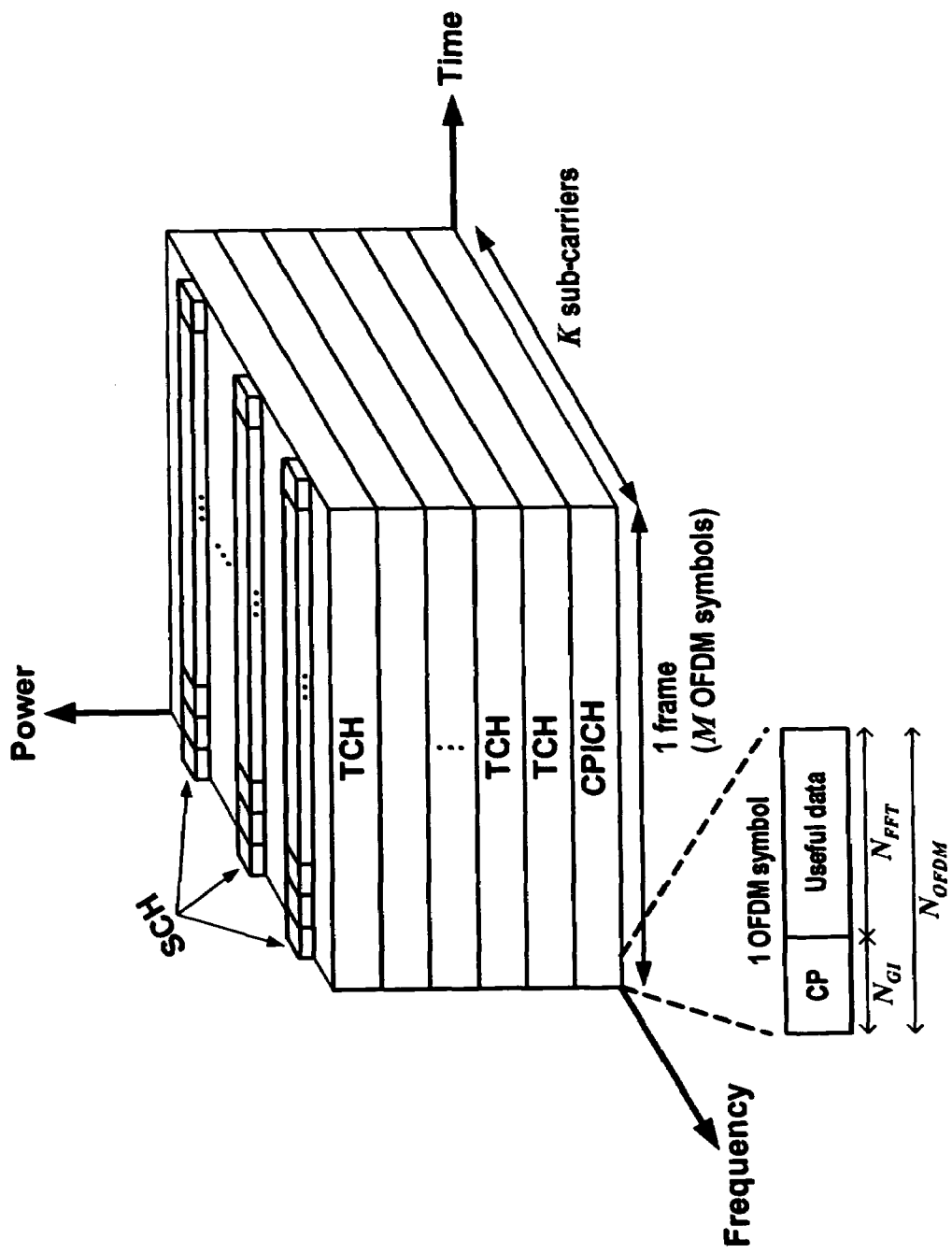
FIG. 1 shows the frame structure of the conventional SCH-based cell search method.
Figure 2:
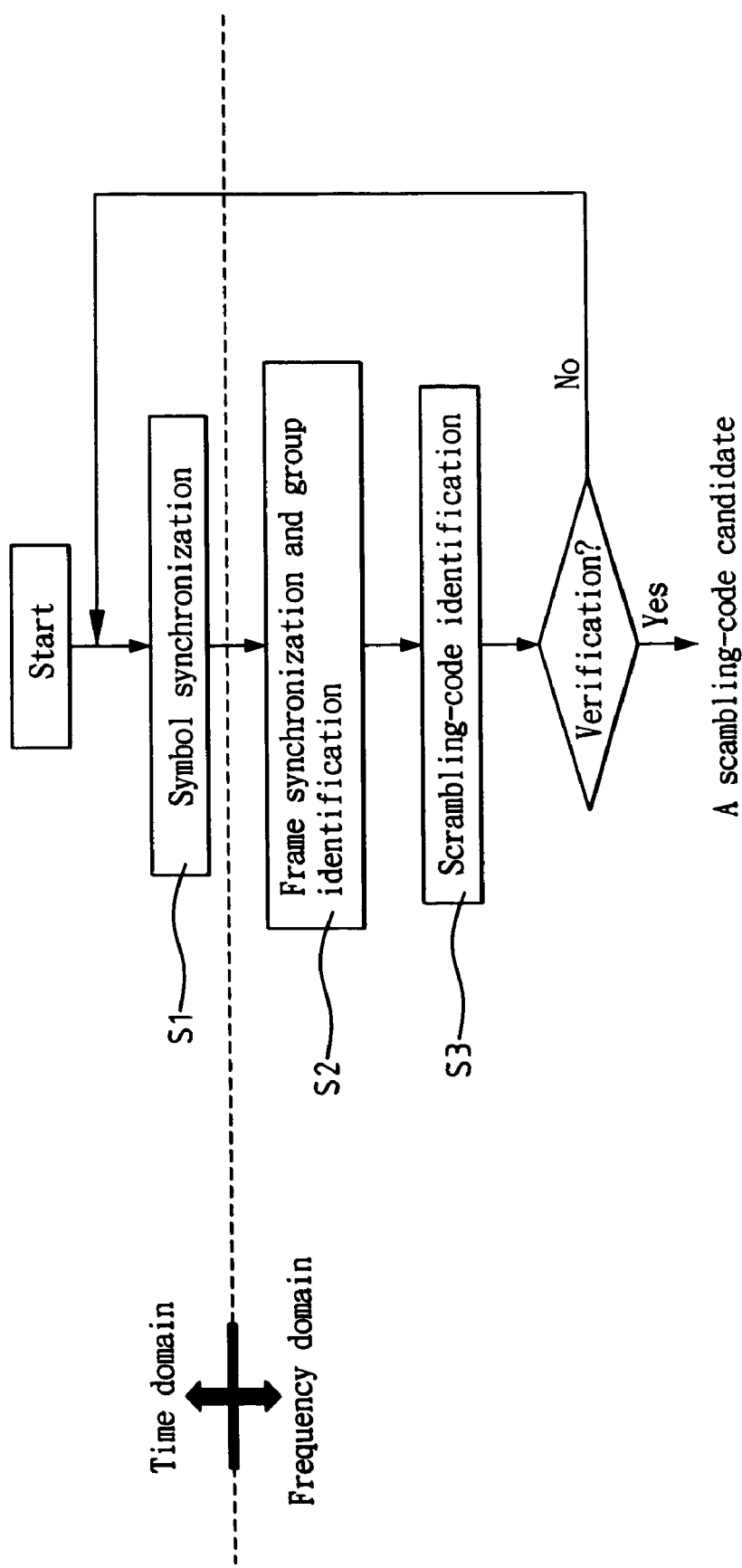
FIG. 2 is a flowchart showing the cell search procedure for conventional cell search methods.
Figure 3:
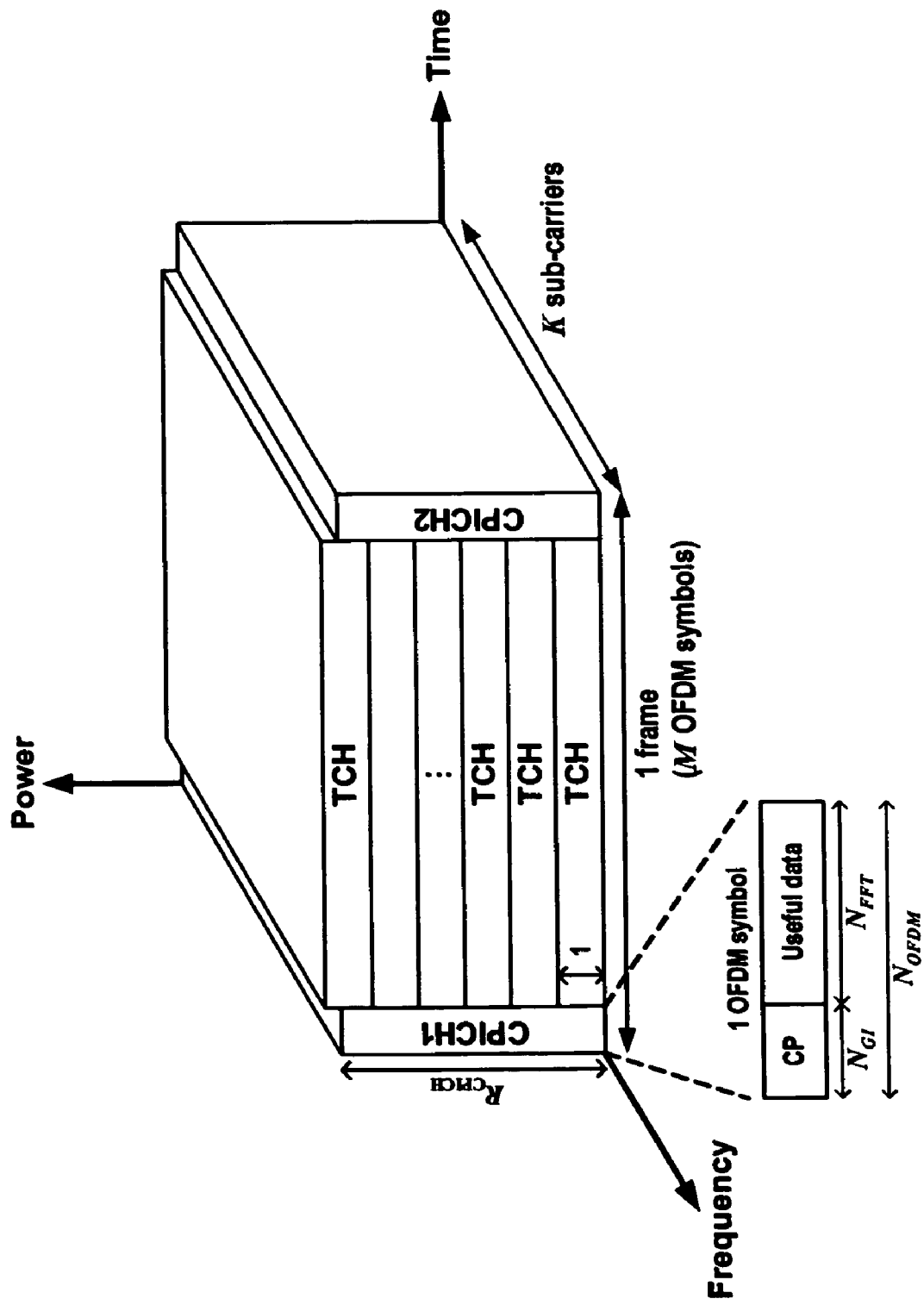
FIG. 3 shows the frame structure of the conventional CPICH-based cell search method.
Figure 4:
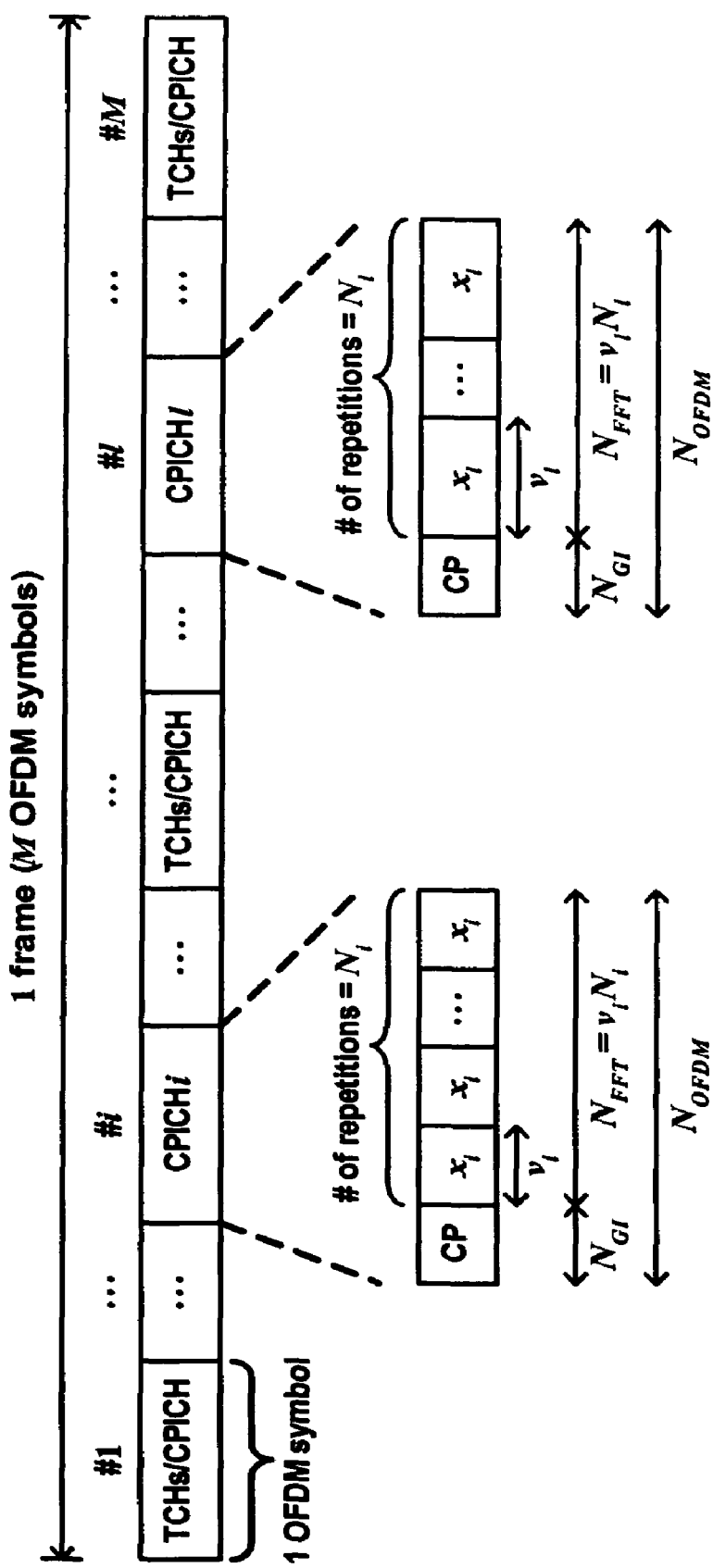
FIG. 4 shows a time-domain frame structure according to the invention.

FIG. 4 shows a time-domain frame structure of the cell search method according the present invention. Referring to FIG. 4, each frame consists of M OFDM symbols, and each OFDM symbol of length $N_{OFDM}$ samples consists of $N_{FFT}$-sample useful data and $N_{GI}$-sample CP (GI). The ith OFDM symbol, indicated by CPICHi, is comprised of CP and $N_i$ repetitive duplicates of a $v_i$-point short sequence, where $N_{FFT}=v_i \cdot N_i$ and $N_i \geq 1$. The other OFDM symbols in the frame may include TCH signal or another CPICH signal. CPICH signal and TCH signal are allocated in different OFDM symbols (different time slots) to avoid interference problem. In a frame as shown in FIG. 4, there is at least one OFDM symbol (without considering GI) that exhibits periodic signal pattern. Also, there is at least one OFDM symbol in a frame that contains the information about the sequences $P^{(p)}[k]$ and $Q^{(q)}[k]$.

Figure 5:
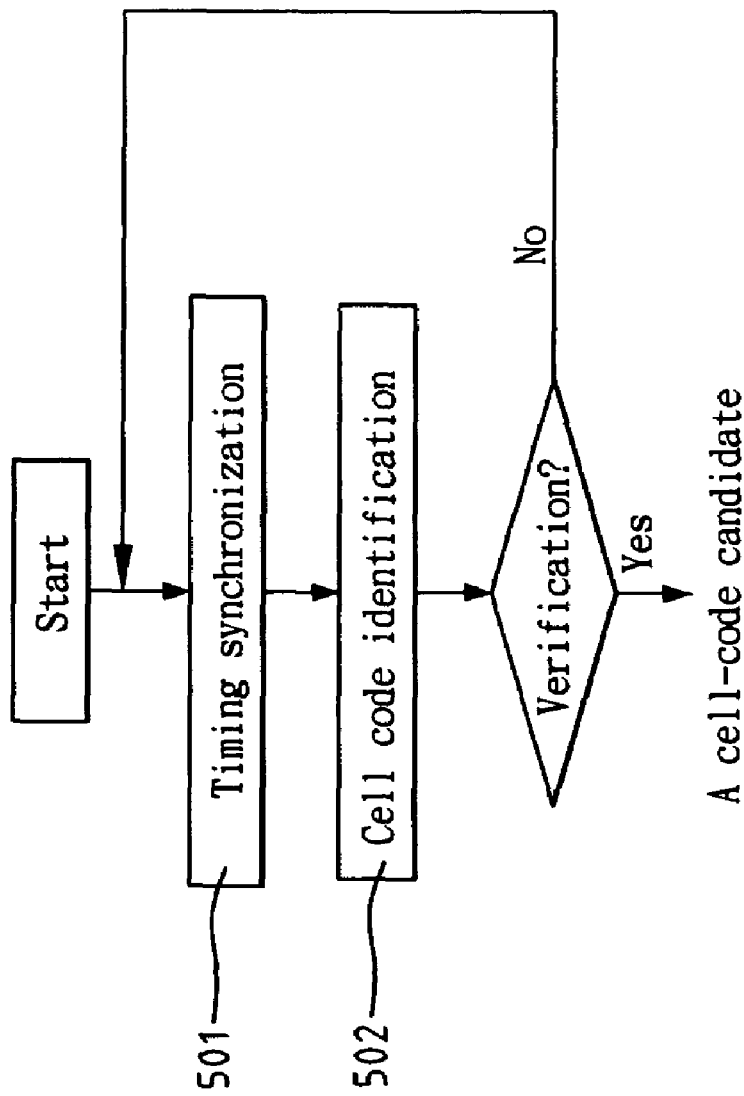
FIG. 5 is a flowchart showing a cell search procedure according to the invention.

FIG. 5 shows the procedure of the cell search method according to the invention. Referring to FIG. 5, the procedure includes two steps: (step 501) timing synchronization to detect OFDM symbol timing and frame timing, and (step 502) cell code identification to detect the cell code $C^{(j)}[k]$.

Verification is included in step 502 to avoid false detection. In step 501, timing can be detected by using the correlation property of CP and the periodic property of the frame structure. In step 502, the sequences $P^{(p)}[k]$ and $Q^{(q)}[k]$ are detected using the correlation property of CPICH signal.

Figure 6:
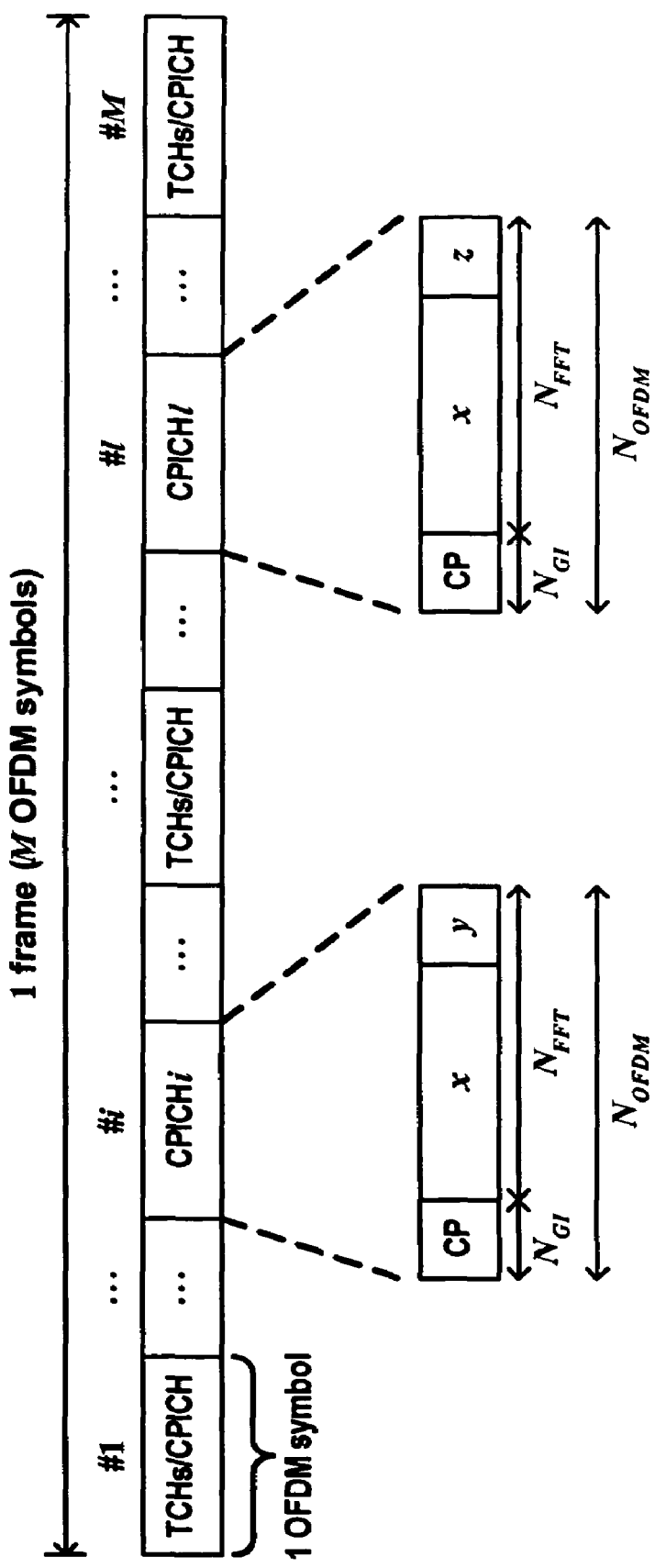
FIGS. 6 and 7 show other time-domain frame structures according to the invention.
Figure 7:
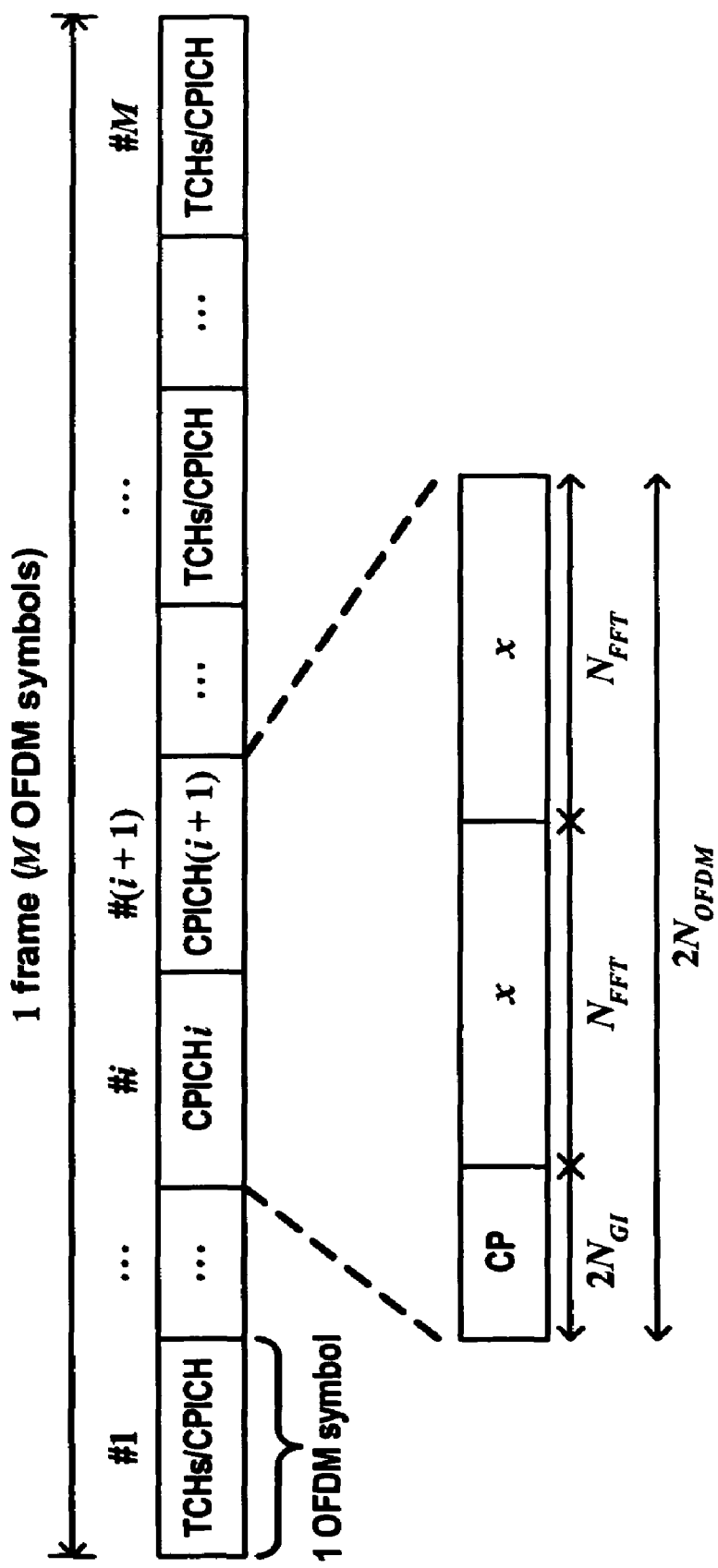

FIGS. 6 and 7 show other time-domain frame structures of the cell search method according the invention. Referring to FIGS. 6 and 7, no OFDM symbol exhibits periodic signal pattern in a frame. Instead, in FIG. 6, there are at least two OFDM symbols in a frame that have the same data in some portions leading to periodic signal pattern in a frame. In FIG. 7, CPICHi and CPICH(i+1) are viewed as a CPICH unit of length $2N_{OFDM}$ in which the length of CP is doubled, namely, $2N_{GI}$. For the frame structure in FIG. 7, there is at least a CPICH unit of length $2N_{OFDM}$ having periodic signal pattern in a frame. The periodic signal patterns in FIGS. 6 and 7 therefore can be used to detect the frame timing. Also, there is at least one OFDM symbol in a frame that contains the information about the sequences $P^{(p)}[k]$ and $Q^{(q)}[k]$ for cell code identification. Accordingly, the cell search procedure shown in FIG. 5 can also be applied to the frame structures in FIGS. 6 and 7.

Figure 8A:
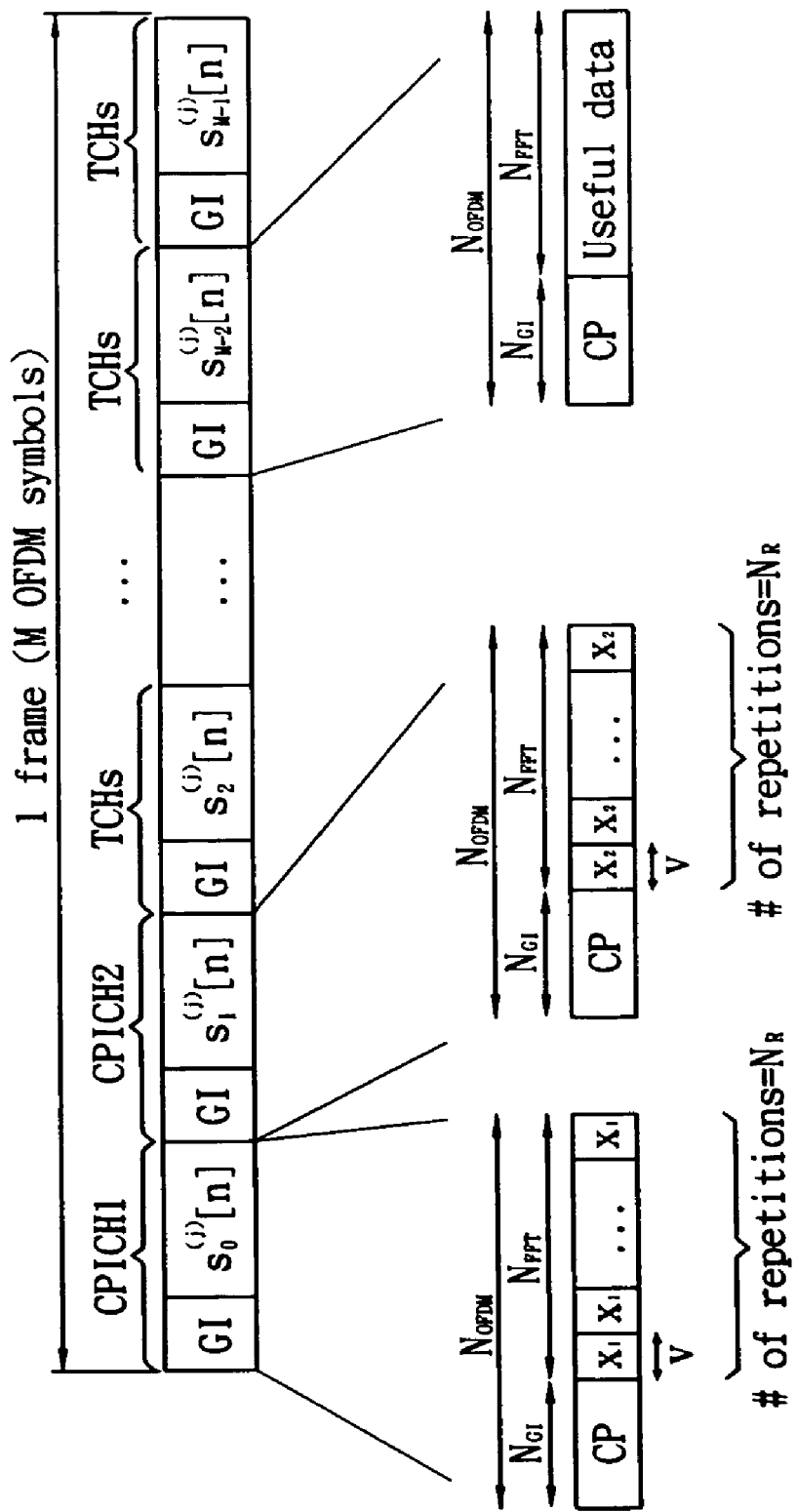
FIG. 8a shows the time-domain frame structure according to the first embodiment of the invention.
Figure 8B:
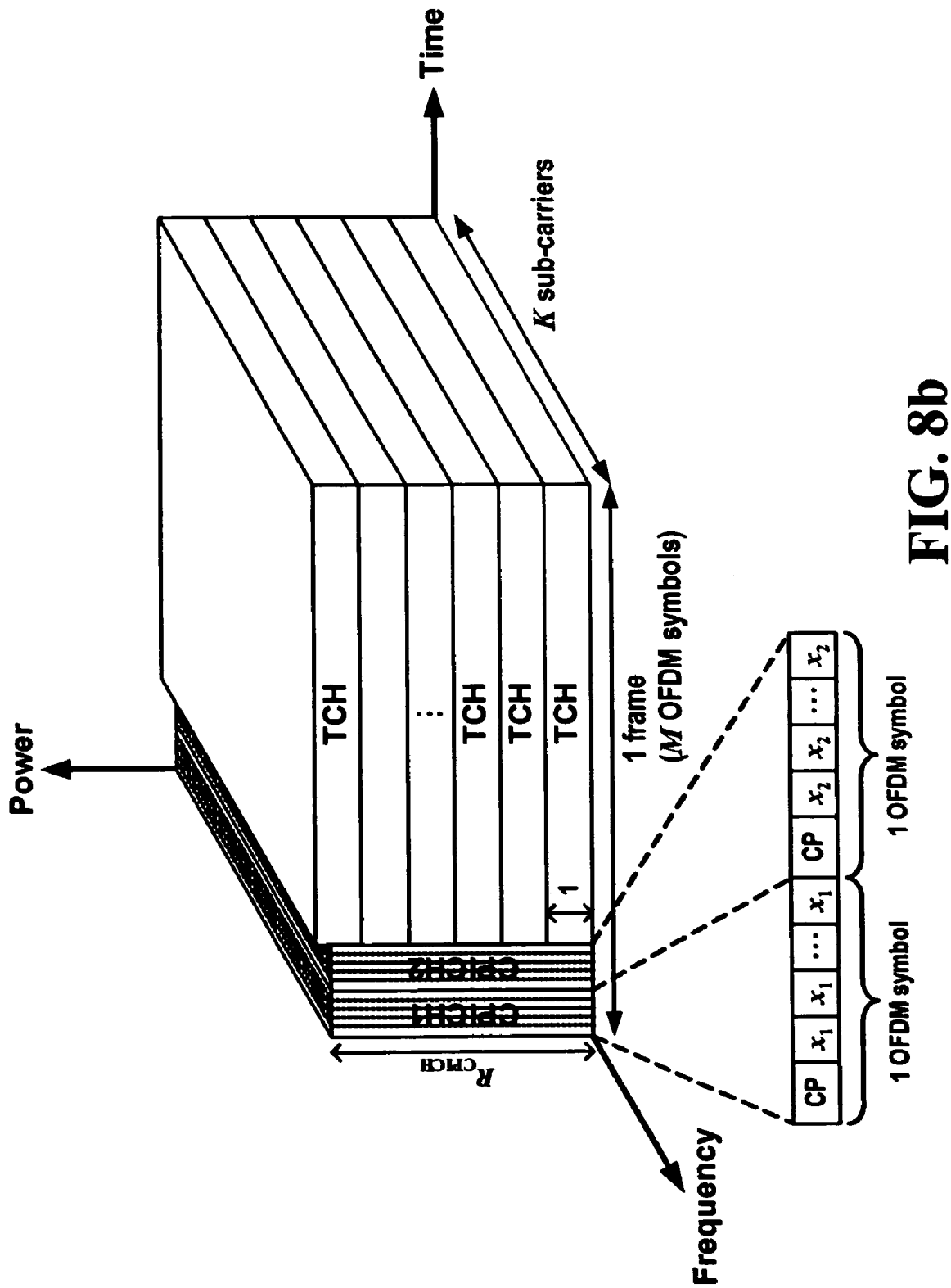

FIG. 8a shows the time-domain flame structure according to the first embodiment of the invention. Referring to FIG. 8a, the first and second OFDM symbols in a frame are CPICH1 and CPICH2, respectively. The remaining (M−2) OFDM symbols in a flame, indicated by TCHs, are used for transmitting TCH data. Clearly, CPICH signal is orthogonal to TCH signal. Let $s^{(j)}[n]$ denote the downlink-transmitted signal associated with cell j. In a flame as shown in FIG. 8a, the transmitted signal of mth OFDM symbol is represented as $s_m^{(j)}[n]$, n=0~$N_{FFT}$−1, without taking GI into account. FIG. 8b shows another view of the flame structure in FIG. 8a, where $R_{CPICH}$ is the power ratio of CPICH signal to the signal of one TCH and K is the number of sub-carriers used in an OFDM symbol.

Figure 9A:
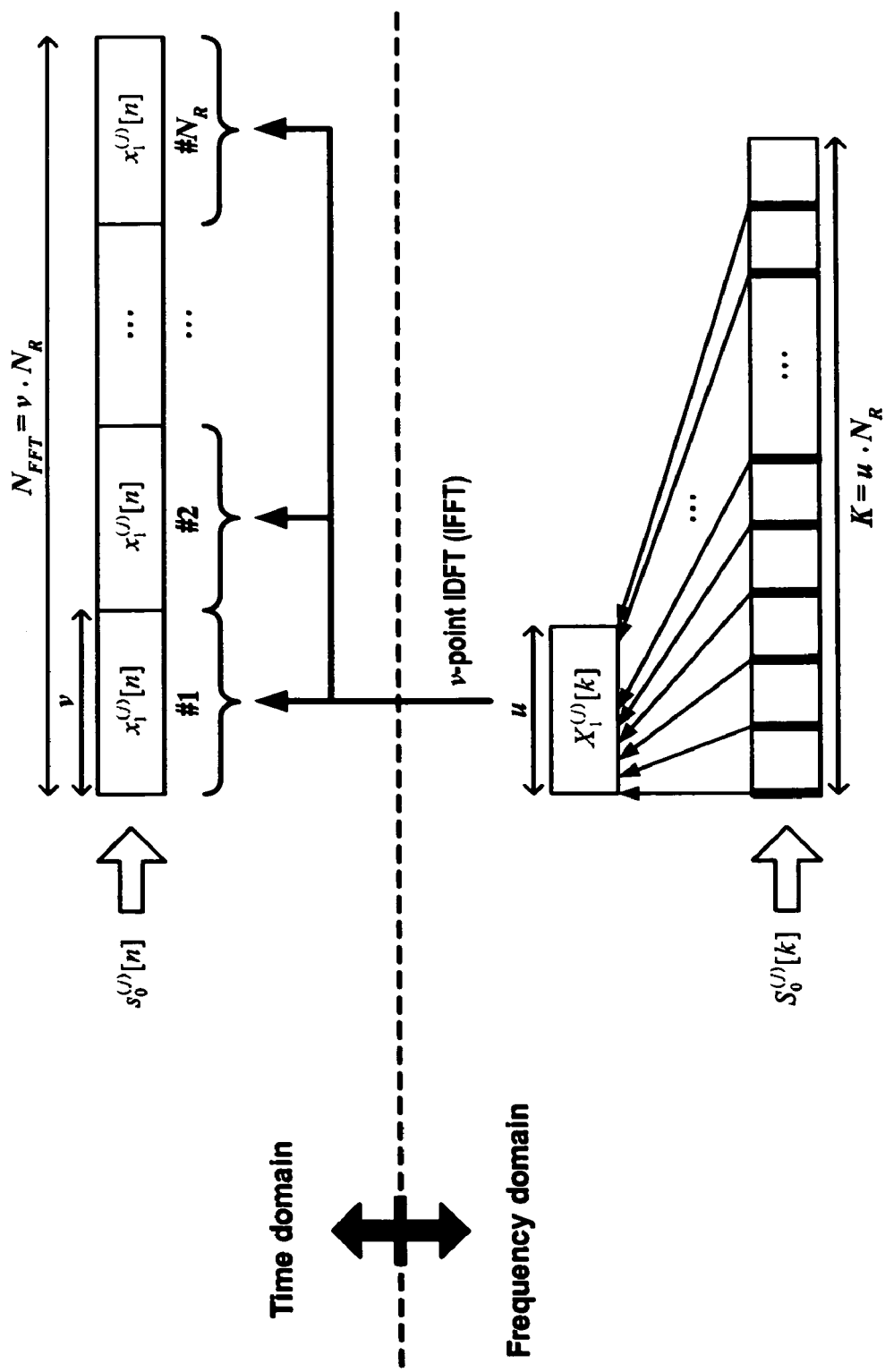

FIG. 9a shows the detailed structure of CPICH1 in FIG. 8a. The time-domain CPICH1 signal, $s_0^{(j)}[n]$, n=0~$N_{FFT}$−1, is comprised of $N_R$ replica of the time-domain short sequence, $x_1^{(j)}[n]$, n=0~v−1, as follows:

$$s_0^{(j)}[n]=x_1^{(j)}[((n))_v], \; n=0\text{~}N_{FFT}-1 \quad (1)$$

where the notation '$((n))_v$' denotes '(n modulo v)'. In other words, the time-domain CPICH1 signal $s_0^{(j)}[n]$ is periodic with period v. The time-domain short sequence $x_1^{(j)}[n]$ can be obtained by taking v-point IDFT (IFFT) of the frequency-domain short sequence, $X_1^{(j)}[k]$, k=0~u−1, where u·$N_R$=K and u≦v.

Figure 9B:
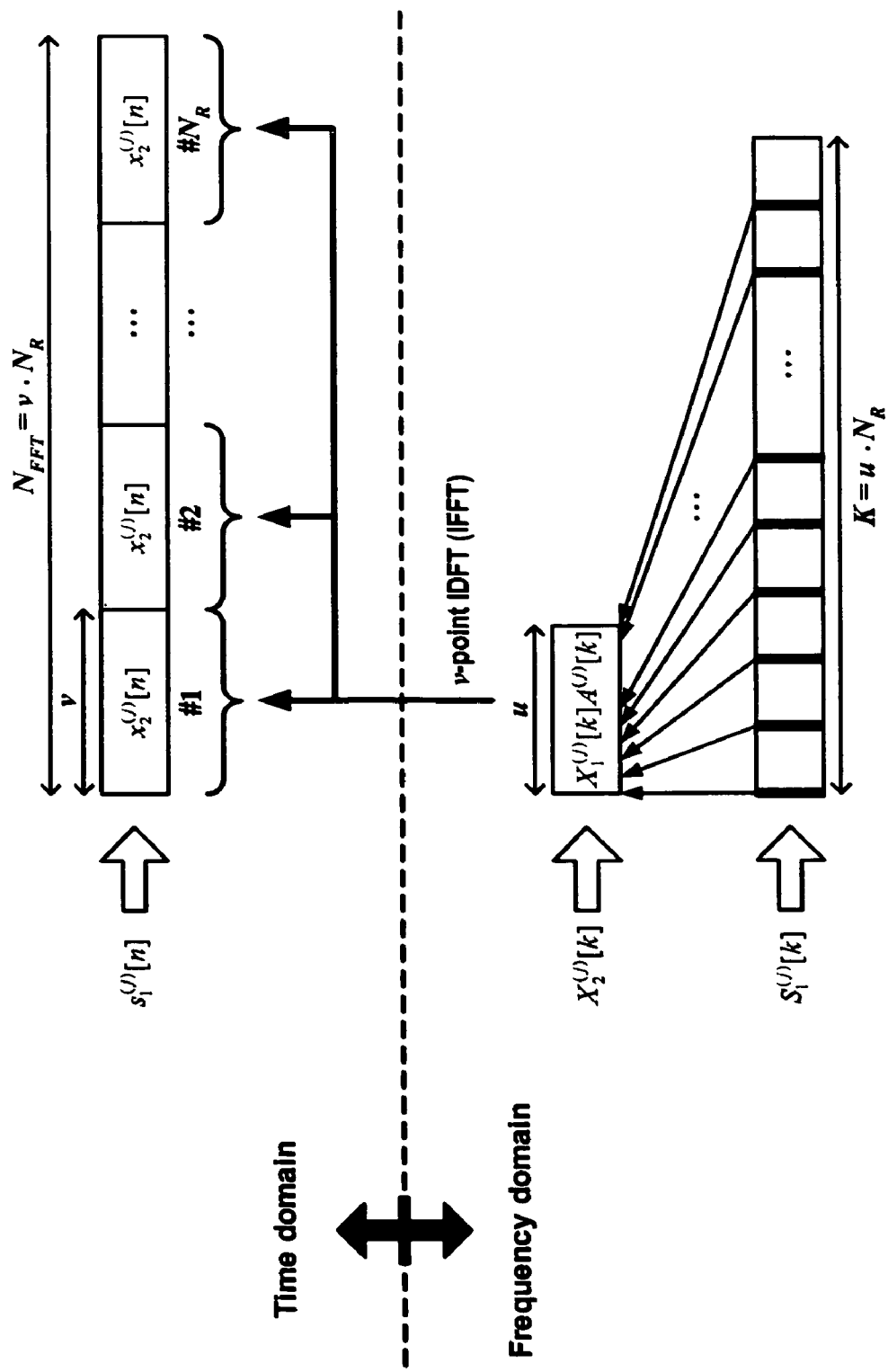

FIG. 9b shows the detailed structure of CPICH2 in FIG. 8a. The time-domain CPICH2 signal, $s_1^{(j)}[n]$, n=0~$N_{FFT}$−1, is comprised of $N_R$ replica of the time-domain short sequence, $x_2^{(j)}[n]$, n=0~v−1, as follows:

$$s_1^{(j)}[n]=x_2^{(j)}[((n))_v], \; n=0\text{~}N_{FFT}-1 \quad (2)$$

In other words, the time-domain CPICH2 signal $s_1^{(j)}[n]$ is also periodic with period v. The time-domain short sequence $x_2^{(j)}[n]$ can be obtained by taking v-point IDFT (IFFT) of the following frequency-domain short sequence:

$$X_2^{(j)}[k]=X_1^{(j)}[k]\cdot A^{(j)}[k], \; k=0\text{~}u-1 \quad (3)$$

The frequency-domain short sequences $X_1^{(j)}[k]$ and $X_2^{(j)}[k]$ (or, equivalently, $X_1^{(j)}[k]$ and $A^{(j)}[k]$), k=0~u−1, can be designed to contain the information about the sequences $P^{(p)}[k]$, k=0~$L_P$−1, and $Q^{(q)}[k]$, k=0~$L_Q$−1. In particular, the sequence $A^{(j)}[k]$ can be designed as follows:

$$A^{(j)}[k]=P^{(p)}[((k))_{L_P}], \text{ for } k\in\Omega_1 \quad (4a)$$

and $$A^{(j)}[k]=Q^{(q)}[((k))_{L_Q}], \text{ for } k\in\Omega_2 \quad (4b)$$

where $\Omega_1$ and $\Omega_2$ are two disjoint sets of the indices of $A^{(j)}[k]$, and $\Omega_1\cup\Omega_2 \subset \{0, 1, \ldots, u-1\}$. In this design, the cell search procedure shown in FIG. 5 can be implemented as the one shown in FIG. 10. Other implementations, however, are also feasible since the short sequence $X_1^{(j)}[k]$ appeared in both CPICH1 and CPICH2 can be set arbitrarily. For example, the short sequence $X_1^{(j)}[k]$ can be set to be identical for all cells, and thus it can be used as a training sequence for simultaneous symbol and frame synchronization as well as for channel estimation.

Let the downlink-transmitted signal $s^{(j)}[n]$ be received, after τ units of time delay, by the receiver of an MS as $$r[n]=h^{(j)}[n]*s^{(j)}[n-\tau]+w^{(j)}[n] \quad (5)$$

where the notation '*' denotes linear convolution operation. In (5), r[n] is the received signal, $h^{(j)}[n]$ is the channel impulse response, and $w^{(j)}[n]$ is the noise component including not only background noise but also interference from other cells and other MS's. The channel $h^{(j)}[n]$ is assumed to be a linear time-invariant (LTI) finite impulse response (FIR) system of length $L_h$. The unknown time delay τ can be further expressed as $$\tau=D\cdot N_{OFDM}+d \quad (6)$$

where D and d are non-negative integers, and 0≦d<$N_{OFDM}$. According to the cell search procedure shown in FIG. 10, the goal of the cell search method of the embodiment is to estimate the unknown time delay d (OFDM symbol timing) in step 1001, estimate the unknown time delay D (frame timing) in step 1002, and identify the sequences $P^{(p)}[k]$ and $Q^{(q)}[k]$ (the cell code $C^{(j)}[k]$) in step 1003.

Figure 11:
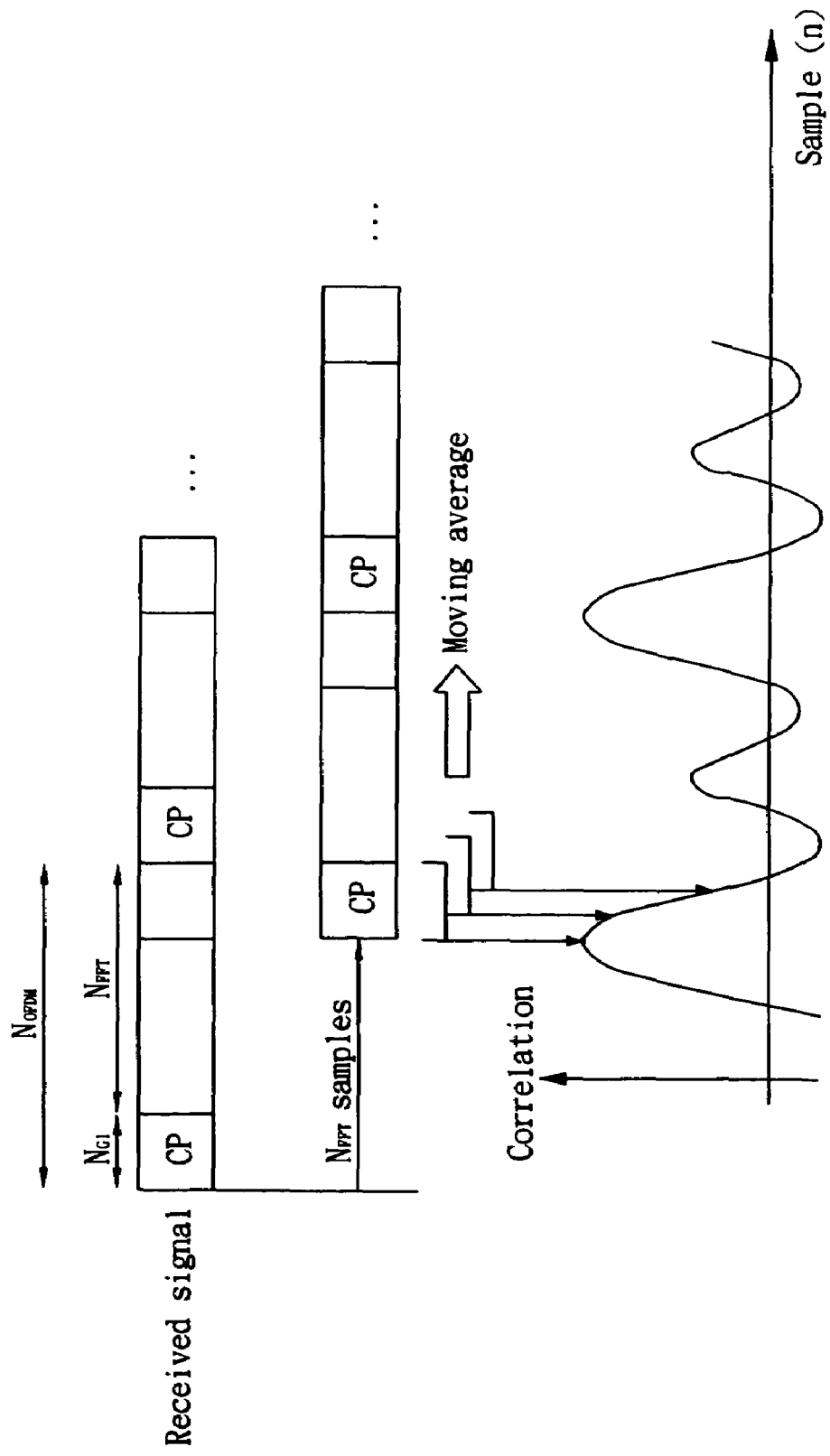
FIG. 11 illustrates step 1001 in FIG. 10, in which the correlation property of CP in received signal is used.

In step 1001, the OFDM symbol timing d is detected by virtue of the correlation property of CP in the received signal r[n], as illustrated in FIG. 11. Correlations between the received signal and its delayed version of $N_{FFT}$ samples are computed and averaged as follows:

$$\Gamma_1[i] = \sum_m \sum_{n=i}^{i+N_{GI}-1} r[mN_{OFDM}+n]r^*[mN_{OFDM}+n+N_{FFT}] \quad (7)$$

where the superscript '*' denotes complex conjugation. From (7), it follows that the symbol timing d can be detected by finding the maximum of $|\Gamma_1[i]|$. Other symbol synchronization methods such as the well-known maximum-likelihood (ML) method and minimum mean-square-error (MMSE) method can also be applied in this step.

After the symbol timing d has been detected in step 1001, there still remains an unknown time delay $D\cdot N_{OFDM}$ (see (6)) between the transmitted signal $s^{(j)}[n]$ and the received signal r[n+d]. In step 1002, the frame timing D is detected by virtue of the property of the periodic signal pattern in both CPICH1 and CPICH2. This is demonstrated from the following derivations.

By assuming the channel length $L_h\leq N_{GI}+1$ (i.e., no ISI and ICI) and removing GI from the received signal r[n] given by (5), the received mth OFDM symbol is obtained as:

$$r_m[n] \equiv r[mN_{OFDM} + d + N_{GI} + n] \qquad (8)$$
$$= \sum_{l=0}^{L_h-1} h^{(j)}[l] \cdot s_{m-D}^{(j)}\left[((n-l))_{N_{FFT}}\right] + w_m^{(j)}[n],$$
$$n = 0 \sim N_{FFT} - 1$$

where $s_{m-D}^{(j)}[n] \equiv s^{(j)}[(m-D)N_{OFDM}+N_{GI}+n]$ and $w_m^{(j)}[n] \equiv w^{(j)}[mN_{OFDM}+d+N_{GI}+n]$ are the transmitted signal (without GI) and the noise associated with the received mth OFDM symbol, respectively. By ignoring noise effect, the received Dth OFDM symbol $r_D[n]$ and (D+1)th OFDM symbol $r_{D+1}[n]$, corresponding to CPICH1 and CPICH2, respectively, can be shown to be periodic with period v. Accordingly, the frame timing D can be detected by computing the autocorrelations of two successive received OFDM symbols as follows:

$$\Gamma_2[m] = \sum_{i=0}^{N_R-1} \sum_{n=0}^{v-1} \{r_m[vi+n] r_m^*\left[((v(i+1)+n))_{N_{FFT}}\right][vi+n] \qquad (9)$$
$$r_{m+1}^*\left[((v(i+1)+n))_{N_{FFT}}\right]\}$$

The searching range of flame timing should involve at least (M+1) OFDM symbols in (9) to ensure that two CPICHs, CPICH1 and CPICH2, are included in the computation. Since both $r_D[n]$ and $r_{D+1}[n]$, $n=0 \sim N_{FFT}-1$, are periodic with period v, $\Gamma_2[m]$ given by (9) has a maximum value at m=D and, thus, the frame timing D is detected by finding the maximum of $|\Gamma_2[m]|$ given by (9).

After the frame timing D has been detected in step 1002, the cell code $C^{(j)}[k]$ is identified in step 1003 by identifying the associated two sequences $P^{(p)}[k]$ and $Q^{(q)}[k]$ by virtue of the frequency-domain relationship between CPICH1 and CPICH2 given by (3), (4a) and (4b).

For reducing noise effect and computational complexity, the received OFDM symbol $r_D[n]$ corresponding to CPICH1 is averaged over $N_R$ replica to obtain $$\bar{r}_D[n] = \frac{1}{N_R} \sum_{i=0}^{N_R-1} r_D[vi+n], \quad n = 0 \sim v-1 \qquad (10a)$$

In the same way, averaging the received OFDM symbol $r_{D+1}[n]$ yields $$\bar{r}_{D+1}[n] = \frac{1}{N_R} \sum_{i=0}^{N_R-1} r_{D+1}[vi+n], \quad n = 0 \sim v-1 \qquad (10b)$$

Taking v-point DFTs of $\bar{r}_D[n]$ and $\bar{r}_{D+1}[n]$, respectively, gives $$\bar{R}_D[k] = \tilde{H}^{(j)}[k] X_1^{(j)}[k], \ k=0 \sim u-1 \qquad (11a)$$

and $$\bar{R}_{D+1}[k] = \tilde{H}^{(j)}[k] X_1^{(j)}[k] A^{(j)}[k], \ k=0 \sim u-1 \qquad (11b)$$

where $\tilde{H}^{(j)}[k]$ is the v-point DFT of $$\tilde{h}^{(j)}[n] = \qquad (12)$$
$$\begin{cases} h^{(j)}[n] + h^{(j)}[n+v] + \ldots + h^{(j)}\left[n + \left(\left\lceil\frac{L_h}{v}\right\rceil - 1\right)v\right], & n = 0 \sim v-1 \\ 0, & \text{otherwise} \end{cases}$$

in which $\lceil a \rceil$ denotes the smallest integer no less than a. From (12), it follows that when $L_h \leq v$, $\tilde{h}^{(j)}[n] = h^{(j)}[n]$; otherwise, $\tilde{h}^{(j)}[n]$ is an aliasing version of $h^{(j)}[n]$.

According to (11a), (11b) and (4a), the desired sequence $P^{(p)}[k]$ can be identified by computing $$\Gamma_{3a}[i] = \sum_{k \in \Omega_1} \bar{R}_D[k] \bar{R}_{D+1}^*[k] \cdot P^{(i)}\left[((k))_{L_P}\right] \qquad (13)$$

which has a maximum value for i=p. Thus, the desired sequence $P^{(p)}[k]$ is identified by searching for the maximum of $|\Gamma_{3a}[i]|$ given by (13) over P candidates of $P^{(p)}[k]$. In a similar way, according to (11a), (11b) and (4b), the desired sequence $Q^{(q)}[k]$ can be identified by computing $$\Gamma_{3b}[i] = \sum_{k \in \Omega_2} \bar{R}_D[k] \bar{R}_{D+1}^*[k] \cdot Q^{(i)}\left[((k))_{L_Q}\right] \qquad (14)$$

which has a maximum value for i=q. As a result, the desired sequence $Q^{(q)}[k]$ is identified by searching for the maximum of $|\Gamma_{3b}[i]|$ given by (14) over Q candidates of $Q^{(q)}[k]$.

Unlike the conventional SCH-based and CPICH-based cell search methods, the process of finding the maximum of $|\Gamma_{3a}[i]|$ given by (13) is independent of that of $|\Gamma_{3b}[i]|$ given by (14). When both the sequences $P^{(p)}[k]$ and $Q^{(q)}[k]$ are identified, the cell code $C^{(j)}[k]$ is correspondingly found.

The verification is included in step 1003 to avoid false detection. Let $\hat{p}$ and $\hat{q}$ be the indices obtained by maximizing $|\Gamma_{3a}[i]|$ and $|\Gamma_{3b}[i]|$, respectively. Then, the identified cell code (i.e., the identified sequences $P^{(\hat{p})}[k]$ and $Q^{(\hat{q})}[k]$) can be verified via the following ratios:

$$\Delta_{3a} = \frac{|\Gamma_{3a}[\hat{p}]|}{\max\{|\Gamma_{3a}[i]|, i \neq \hat{p}\}} \text{ and} \qquad (15a)$$

$$\Delta_{3b} = \frac{|\Gamma_{3b}[\hat{q}]|}{\max\{|\Gamma_{3b}[i]|, i \neq \hat{q}\}} \qquad (15b)$$

When both $\Delta_{3a}$ and $\Delta_{3b}$ exceed a pre-assigned threshold, the identified cell code is thought as a cell-code candidate with a high-confidence score. For this case, MS determines that the cell search procedure is completed successfully, and it then proceeds the subsequent processes such as frequency synchronization, read of broadcast information, and measurement of signal-to-interference-plus-noise ratio. Otherwise, MS continues the cell search procedure until a reliable cell-code candidate is obtained.

As shown above, the cell search procedure of the first embodiment requires only two v-point DFT operations for step 1003. This implies that compared with the conventional SCH-based and CPICH-based methods, the computation complexity of the cell search method for the first embodiment of the present invention is relatively low. Moreover, the cell search method for the first embodiment of the present invention requires no further assumption on the LTI FIR channel $h^{(j)}[n]$, implying that it is quite robust against channel effects.

Subsequently, a second embodiment of the present invention with relatively low complexity is provided.

Figure 12A:
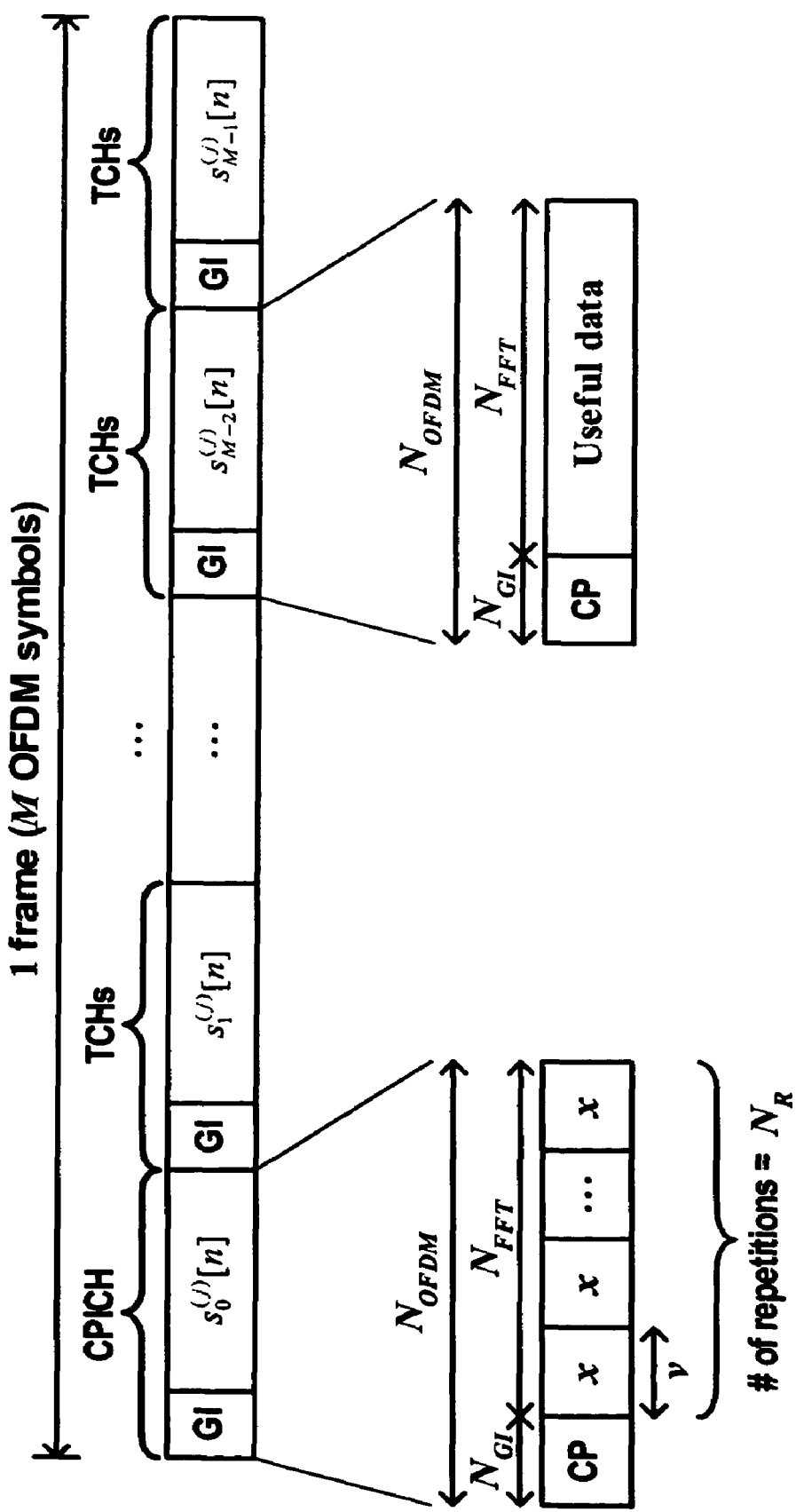
FIG. 12a shows the time-domain structure according to the second embodiment of the invention.
Figure 12B:
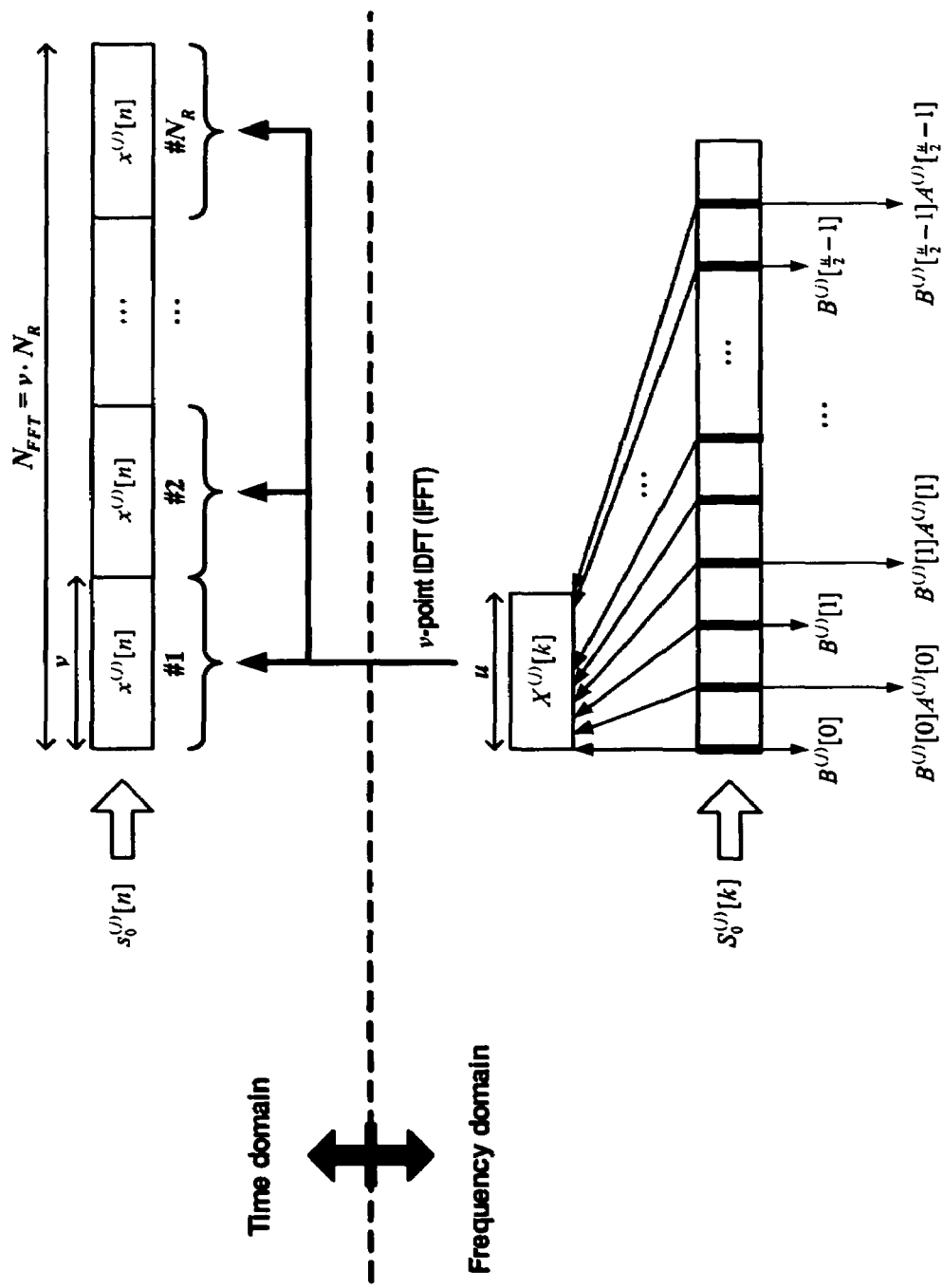

FIG. 12a shows the time-domain frame structure according to the second embodiment of the present invention. Referring to FIG. 12a, the first OFDM symbol in a frame is CPICH. The remaining (M−1) OFDM symbols in a frame are used for transmitting TCH data FIG. 12b shows the detailed structure of CPICH in FIG. 12a. The time-domain CPICH signal, $s_0^{(j)}[n]$, $n=0 \sim N_{FFT}-1$, is comprised of $N_R$ replica of the time-domain short sequence, $x^{(j)}[n]$, $n=0 \sim v-1$, as follows:

$$s_0^{(j)}[n]=x^{(j)}[((n))_v], \ n=0 \sim N_{FFT}-1 \quad (16)$$

In other words, the time-domain CPICH signal $s_0^{(j)}[n]$ is periodic with period v. The time-domain short sequence $x^{(j)}[n]$ can be obtained by taking v-point IDFT (IFFT) of of the following frequency-domain short sequence:

$$X^{(j)}[2k] = B^{(j)}[k], \ k=0 \sim \frac{u}{2} - 1 \text{ and} \quad (17a)$$

$$X^{(j)}[2k+1] = B^{(j)}[k] \cdot A^{(j)}[k], \ k=0 \sim \frac{u}{2} - 1 \quad (17b)$$

The frequency-domain short sequence $X^{(j)}[k]$ (or, equivalently, $B^{(j)}[k]$ and $A^{(j)}[k]$) can be designed to contain the information about the sequences $P^{(p)}[k]$, $k=0 \sim L_P - 1$, and $Q^{(j)}[k]$, $k=0 \sim L_Q - 1$. In particular, the sequence $A^{(j)}[k]$ can be designed as follows:

$$A^{(j)}[k]=P^{(p)}[((k))_{L_P}], \text{ for } k \in \Omega_1 \quad (18a)$$

and $$A^{(j)}[k]=Q^{(q)}[((k))_{L_Q}], \text{ for } k \in \Omega_2 \quad (18b)$$

where $\Omega_1$ and $\Omega_{02}$ are two disjoint sets of the indices of $A^{(j)}[k]$, and $\Omega_1 \cup \Omega_2 \subset \{0, 1, \ldots, (u/2)-1\}$. In this design, the sequence $B^{(j)}[k]$ in (17a) and (17b) can be set arbitrarily.

Figure 10:
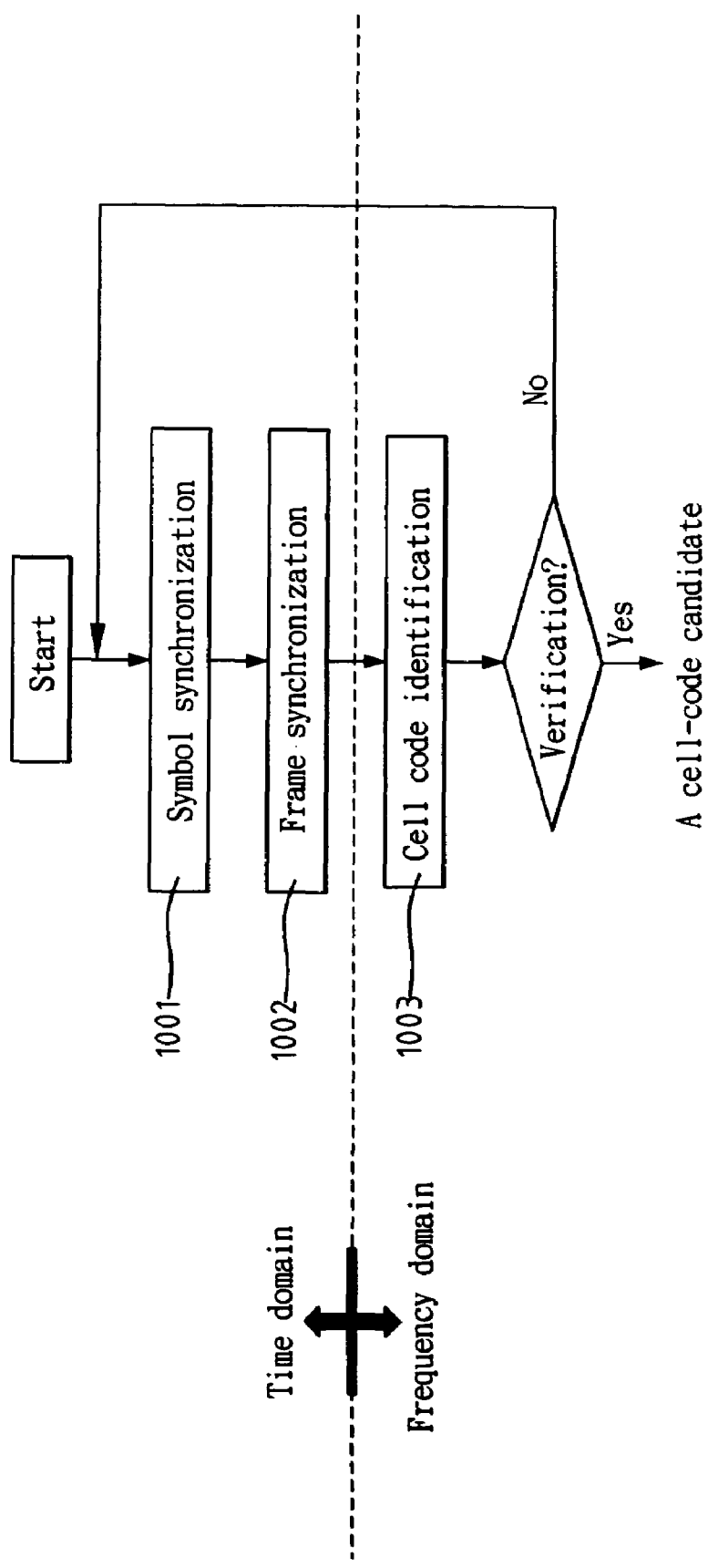
FIG. 10 is a flowchart showing a cell search procedure according to the first and second embodiments of the invention.

Similar to the first embodiment of the present invention, the cell search procedure shown in FIG. 10 can also be used for the second embodiment of the present invention. In step 1001, the OFDM symbol timing d is detected by finding the maximum of $|\Gamma_1[i]|$ given by (7). After the symbol timing d has been detected in step 1001, the frame timing D can be detected by computing the autocorrelations of received OFDM symbols as follows:

$$\Gamma_2[m] = \sum_{i=0}^{N_R-1} \sum_{n=0}^{v-1} r_m[vi+n]r_m^*[((v(i+1)+n))_{N_{FFT}}] \quad (19)$$

where $r_m[n]$ is given by (8). Since the received Dth OFDM symbol $r_D[n]$, corresponding to CPICH signal, is periodic with period v, $\Gamma_2[m]$ given by (19) has a maximum value at m=D. Thus, in step 1002, the frame timing D is detected by finding the maximum of $|\Gamma_2[m]|$ given by (19).

After the frame timing D has been detected in step 1002, the cell code $C^{(j)}[k]$ is identified in step 1003 by identifying the associated two sequences $P^{(p)}[k]$ and $Q^{(j)}[k]$ by virtue of the frequency-domain relationship given by (17a), (17b),
(18a) and (18b). For reducing noise effect and computational complexity, the received OFDM symbol $r_D[n]$, corresponding to CPICH, is averaged over $N_R$ replica to obtain the averaged time-domain signal $\bar{r}_D[n]$ as given by (10a). Taking v-point DFT of $\bar{r}_D[n]$ gives $$\bar{R}_D[k]=\tilde{H}^{(j)}[k], \ k=0 \sim u-1 \quad (20)$$

where $\tilde{H}^{(j)}[k]$ is the v-point DFT of $\tilde{h}^{(j)}[n]$ given by (12).

According to (20), (17a), (17b), and (18a), the desired sequence $P^{(p)}[k]$ can be identified by computing $$\Gamma_{3a}[i] = \sum_{k \in \Omega_1} \bar{R}_D[2k]\bar{R}_D^*[2k+1] \cdot P^{(i)}[((k))_{L_P}] \quad (21)$$

which has a maximum value for i=p as $\tilde{H}^{(j)}[2k] \cong \tilde{H}^{(j)}[2k+1]$. Thus, the desire sequence $P^{(p)}[k]$ is identified by searching for the maximum of $|\Gamma_{3a}[i]|$ given by (21) over P candidates of $P^{(p)}[k]$. In a similar way, according to (20), (17a), (17b), and (18b), the desired sequence $Q^{(q)}[k]$ can be identified by computing $$\Gamma_{3b}[i] = \sum_{k \in \Omega_2} \bar{R}_D[2k]\bar{R}_D^*[2k+1] \cdot Q^{(i)}[((k))_{L_Q}] \quad (22)$$

which has a maximum value for i=q as $\tilde{H}^{(j)}[2k] \cong \tilde{H}^{(j)}[2k+1]$. As a result, the desired sequence $Q^{(q)}[k]$ is identified by searching for the maximum of $|\Gamma_{3b}[i]|$ given by (22) over Q candidates of $Q^{(q)}[k]$. When both the sequences $P^{(p)}[k]$ and $Q^{(q)}[k]$ are identified, the cell code $C^{(j)}[k]$ is correspondingly found. Finally, the identified cell code is also verified as that in the first embodiment of the present invention.

As shown above, the cell search procedure for the second embodiment of the present invention requires only one v-point DFT operation for step 1003, and thus its computation complexity is relatively low. Moreover, the cell search method for the second embodiment of the present invention requires only the channel assumption of $\tilde{H}^{(j)}[2k] \cong \tilde{H}^{(j)}[2k+1]$, which holds for typical applications. This therefore implies that the cell search method for the second embodiment of the present invention is robust against typical channel effects.

In the following, some calculation and simulation results regarding the first embodiment of the present invention are provided for verifying the present invention. An MC-CDMA cellular system was considered, in which the scrambling code (cell code) $C^{(j)}[k]$, $k=0 \sim K-1$ (i.e., $L_C=K$), was used and represented by only the sequence $P^{(p)}[k]$, $k=0 \sim u-1$ (i.e., $L_P=u$). In other words, the sequence $Q^{(q)}[k]$, $k=0 \sim L_Q - 1$, was inexistent and the set $\Omega_2$ in (4b) was accordingly an empty set for the illustration.

Figure 13:
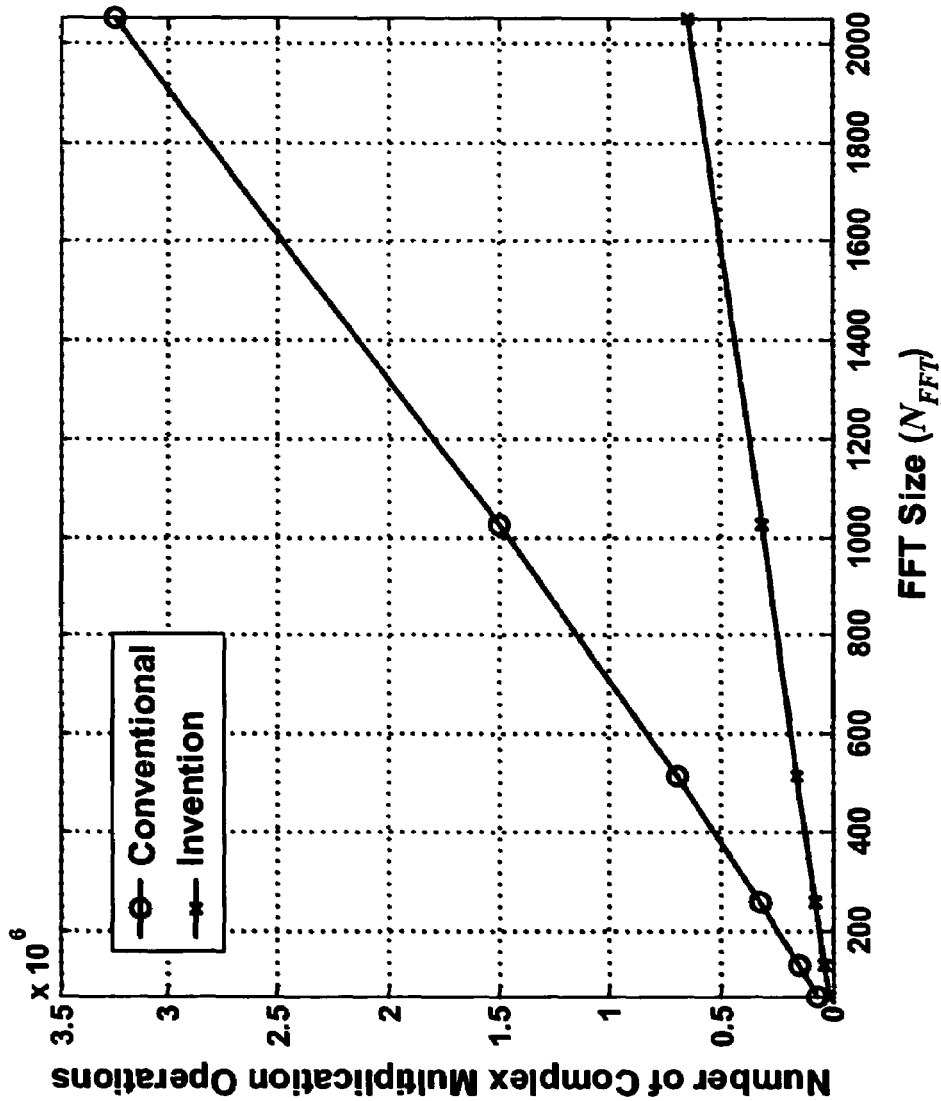
FIG. 13 shows the number of complex multiplication operations required for an iteration of cell search procedure versus FFT size for the conventional CPICH-based method and the first embodiment of the present invention.

FIG. 13 shows the number of complex multiplication operations required for an iteration of the cell search procedure versus FFT size for the conventional CPICH-based method and the first embodiment of the present invention. Less computation complexity means more power savings. From FIG. 13, it can be seen that the computation complexity of the conventional CPICH-based method is about 4~5 times higher than that of the first embodiment of the present invention.

Figure 14A:
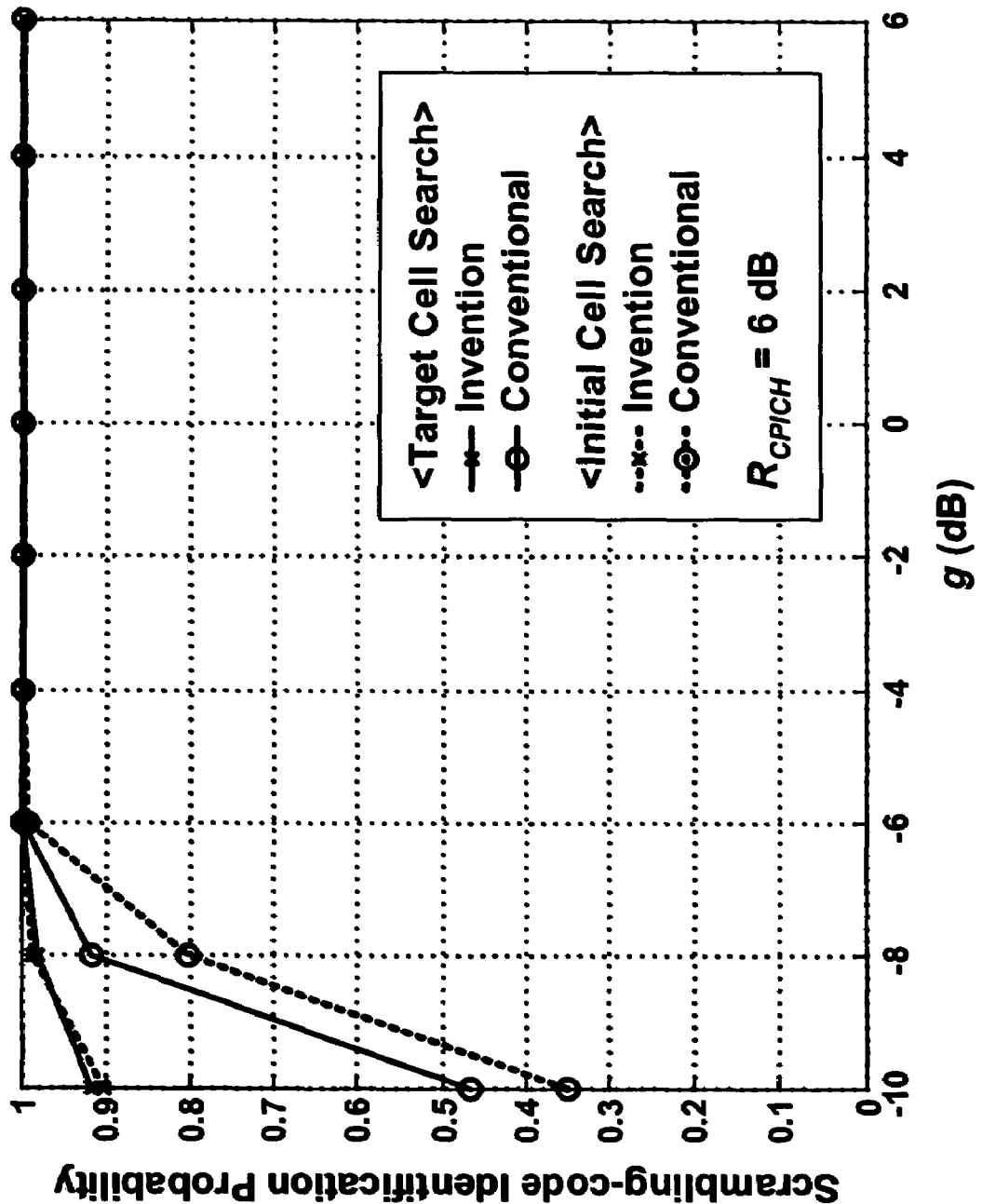
FIG. 14a and FIG. 14b plot the scrambling-code identification performance of desired cell versus geometry factor g for the conventional CPICH-based method and the first embodiment of the present invention for $R_{CPICH}=6$ dB and $R_{CPICH}=9$ dB, respectively.
Figure 14B:
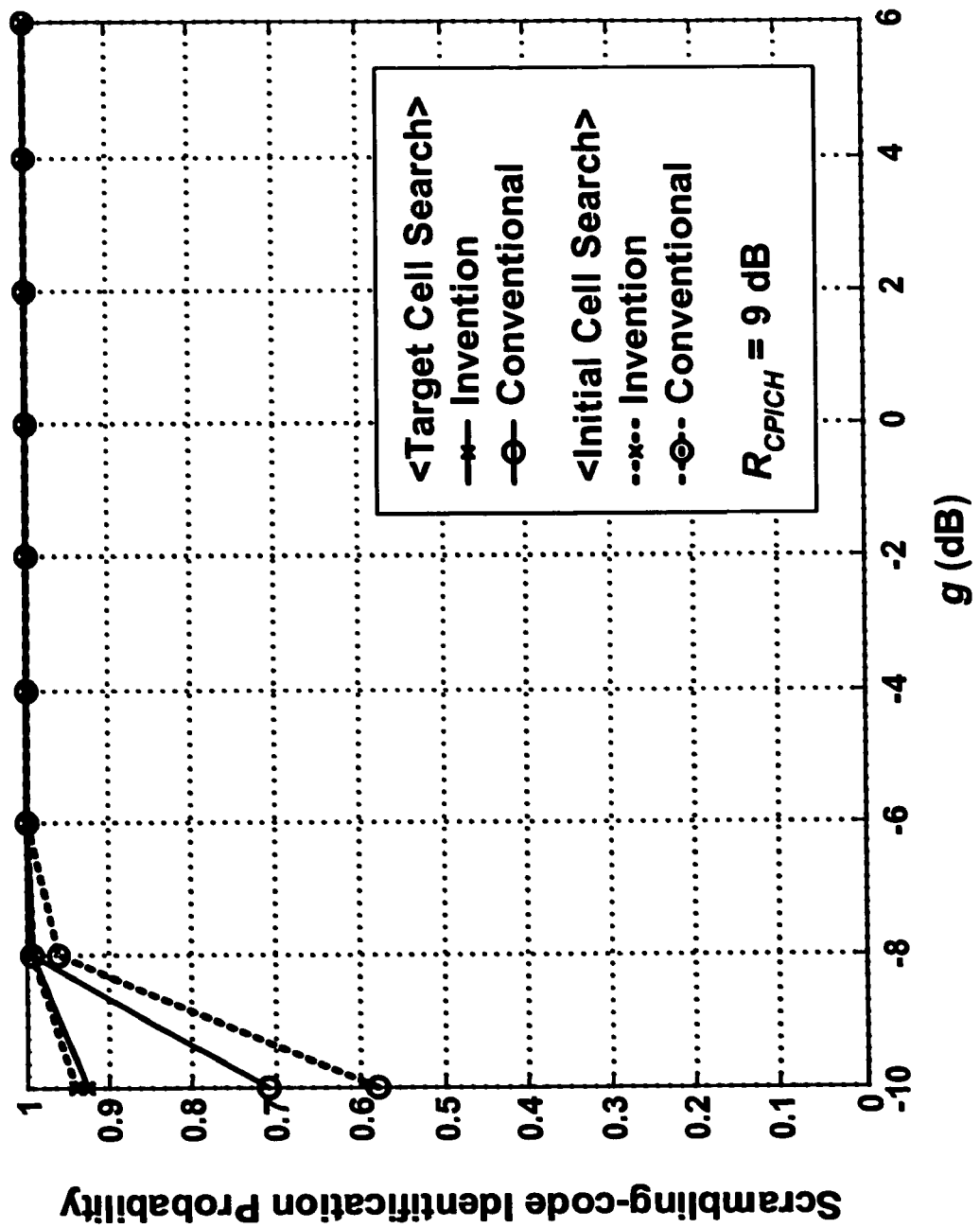

FIG. 14a and FIG. 14b plot the performance of scrambling-code identification versus geometry factor, g, for the conventional CPICH-based method and the first embodiment of the present invention for $R_{CPICH}=6$ dB and $R_{CPICH}=9$ dB, respectively. The geometry factor g of cell j is defined as $$g = \frac{E\{|s_0^{(j)}[n]|^2\}}{E\{|w_1[n]|^2\} + E\{|w_2[n]|^2\}} \quad (23)$$

where $w_1[n]$ is the inter-cell interference and $w_2[n]$ is the background noise. A high value of g indicates that MS is close to BS in cell j, whereas a low value of g indicates that MS is near cell boundary. From FIGS. 14*a* and 14*b*, it can be seen that the cell search method of the present invention outperforms the conventional CPICH-based method for both initial and target cell search, especially for the condition of low value of g. This reveals that the cell search method of the present invention requires fewer iterations in the cell search procedure for finding a cell-code candidate with a high-confidence score and accordingly less average acquisition time as well as lower power consumption.

Although the present invention has been described with reference to the preferred embodiments, it should be understood that the invention is not limited to the details described thereof. Various substitutions and modifications have been suggested in the foregoing description, and others will occur to those of ordinary skill in the art For example, the frame structure may have a number of CPICHs other than one or two. CPICHs may be arranged in various OFDM symbols other than the first and second OFDM symbols in a frame. CPICHs may be periodic with different periods. Therefore, all such substitutions and modifications are intended to be embraced within the scope of the invention as defined in the appended claims.

What is claimed is:

1. An apparatus for time synchronization and code identification for cell detection in an orthogonal frequency division multiplexing (OFDM) based cellular communication system, said apparatus comprising a time-domain frame structure having a plurality of OFDM symbols, wherein at least one of said OFDM symbols has a guard interval and a periodic signal pattern for detecting frame timing and code identification, and at least one of said OFDM symbols comprises cell code information in a common pilot channel (CPICH) signal of a cell code.

2. The apparatus for time synchronization and code identification as claimed in claim 1, wherein each of said OFDM symbols comprises $N_{OFDM}$ samples including $N_{GI}$ samples of cyclic prefix (CP) in a guard interval and $N_{FFT}$ samples of data, and said at least one OFDM symbol having a periodic signal pattern is an ith OFDM symbol represented by $CPICH_i$ in which said periodic signal pattern comprises $N_i$ repetitive duplicates of a $v_i$-point short sequence, wherein $N_{FFT}=v_i \cdot N_i$ and $N_i \geq 1$.

3. The apparatus for time synchronization and code identification as claimed in claim 1, wherein said plurality of OFDM symbols further include at least one OFDM symbol having a traffic channel (TCH) signal, or another OFDM symbol having another common pilot channel (CPICH) signal, and TCH and CPICH signals are allocated in different OFDM symbols.

4. The apparatus for time synchronization and code identification as claimed in claim 1, wherein said plurality of OFDM symbols include at least one OFDM symbol comprising information of a cell code represented by two sequences.

5. The apparatus for time synchronization and code identification as claimed in claim 1, wherein at least one of said OFDM symbols comprises repetitive duplicates of a v-point time domain short sequence, said v-point time-domain short sequence being obtained by taking v-point inverse discrete Fourier transform (IDFT) or inverse fast Fourier transfer (IFFT) of a frequency-domain short sequence.

6. The apparatus for time synchronization and code identification as claimed in claim 1, wherein at least one of said OFDM symbols comprises repetitive duplicates of a first v-point time domain short sequence and at least another of said OFDM symbols comprises repetitive duplicates of a second v-point time domain short sequence, said first and second v-point time-domain short sequences being obtained by taking v-point inverse discrete Fourier transform (IDFT) or inverse fast Fourier transfer (IFFT) of first and second frequency-domain short sequences respectively.

7. An apparatus for time synchronization and code identification for cell detection in an orthogonal frequency division multiplexing (OFDM) based cellular communication system, said apparatus comprising a time-domain frame structure having a plurality of OFDM symbols each including a guard interval and a signal pattern, wherein a portion of the signal pattern of one of said OFDM symbols is identical to a portion of the signal pattern of at least another of said OFDM symbols with the identical portions of the signal patterns forming a periodic pattern, and at least one of said OFDM symbols comprises cell code information in a common pilot channel (CPICH) signal of a cell code for detecting frame timing and code identification.

8. The apparatus for time synchronization and code identification as claimed in claim 7, wherein said plurality of OFDM symbols further include at least one OFDM symbol having a traffic channel (TCH) signal, or other OFDM symbols having other common pilot channel (CPICH) signals, and TCH and CPICH signals are allocated in different OFDM symbols.

9. The apparatus for time synchronization and code identification as claimed in claim 7, wherein said plurality of OFDM symbols include at least one OFDM symbol comprising information of a cell code represented by two sequences.

10. An apparatus for time synchronization and code identification for cell detection in an orthogonal frequency division multiplexing (OFDM) based cellular communication system, said apparatus comprising a time-domain frame structure having a plurality of OFDM symbols each including a regular guard interval and a signal pattern, and at least two consecutive OFDM symbols having a common guard interval followed by two identical signal patterns with said common guard interval having a length equal to the length of two regular guard intervals, wherein at least one of said OFDM symbols comprises cell code information in a common pilot channel (CPICH) signal of a cell code for detecting frame timing and code identification.

11. The apparatus for time synchronization and code identification as claimed in claim 10, wherein said plurality of OFDM symbols further include at least one OFDM symbol having a traffic channel (TCH) signal, or other OFDM symbols having other common pilot channel (CPICH) signals, and TCH and CPICH signals are allocated in different OFDM symbols.

12. The apparatus for time synchronization and code identification as claimed in claim 10, wherein at least one OFDM symbol comprises information of a cell code represented by two sequences.

* * * * *